United States Patent [19]
Donato

[11] Patent Number: 5,119,410
[45] Date of Patent: Jun. 2, 1992

[54] ROTATING POISITIONING INSTRUMENT FOR INTRA ORAL RADIOGRAPHY

[76] Inventor: Dominic A. Donato, 1340 Summit La., Mountainside, N.J. 07092

[21] Appl. No.: 670,014

[22] Filed: Mar. 15, 1991

[51] Int. Cl.⁵ .............................................. G03B 42/04
[52] U.S. Cl. .................................... 378/170; 378/167; 378/187; 378/205
[58] Field of Search ............... 378/167, 168, 170, 187, 378/205

[56] References Cited

U.S. PATENT DOCUMENTS

| | | | |
|---|---|---|---|
| 4,507,798 | 3/1985 | Welander | 378/168 |
| 4,538,292 | 8/1985 | Lindén | 378/170 |
| 4,866,750 | 9/1989 | Chavarria et al. | 378/168 |
| 4,965,885 | 10/1990 | Fuhrmann | 378/168 |
| 5,044,009 | 8/1991 | Klauser | 378/168 |

Primary Examiner—Janice A. Howell
Assistant Examiner—Don Wong

[57] ABSTRACT

An x-ray film positioning device wherein the film holder and x-ray beam alignment rod can rotate together while the biteblock remains stationary. Such rotation is accomplished by means of an axle placed through the body of the biteblock, or through tubes attached to the biteblock, and attaching the film holder to one end of an extension bar and attaching the other end of the extension bar to one end of the axle, and further attaching the beam alignment rod to the other end of the axle. By the configuration of this assembly, a predetermined relationship of the film to the x-ray beam e.g. parallel, can be maintained with all angles of rotation. Simultaneously, the biteblock remains stationary in a flat, occlusally parallel position, held securely between the upper and lower teeth. This rotational concept is particularly helpful, but not limited to, film holder biteblock arrangements which are laterally offset one to the other when viewed from the x-ray source.

4 Claims, 3 Drawing Sheets

ROTATING POISITIONING INSTRUMENT FOR INTRA ORAL RADIOGRAPHY

BACKGROUND OF THE INVENTION

1. Field of the Invention

The present invention relates generally to an x-ray film holder and associated alignment rod which rotate together relative to a stationary biteblock for use in dental radiography. By the nature of the configuration herein described, the invention is especially useful for, but not limited to, film holder biteblock arrangements which are laterally off-set one to the other when viewed from the x-ray source. Such lateral off-set instruments are useful for endodontic radiography.

2. Description of the Related Art and Summary of the Invention

When taking dental periapical radiographs, because of the curvature of the palate and the various angulations of the roots of the teeth, as well as observance of the rules of the paralleling and bisecting angle techniques, it is often necessary to place the film in the mouth at an angle between 90 and 180 degrees with respect to the occlusal plane. When the film holder and beam alignment rod are rigidly fixed to the biteblock, which is the case with much of the prior art e.g. U.S. Pat. No. 3,473,026, it is necessary to angle the biteblock with respect to the occlusal surfaces of the teeth in order to achieve the desired angle of the film holder. When the biteblock is at an angle i.e. not parallel to the biting surfaces of the teeth, it cannot be grasped with maximum security between the upper and lower teeth, and, at times, it cannot be grasped at all. This results in the operator having to compromise by changing the angle of the film holder to a less than optimal one.

With respect to prior art, patented device, U.S. Pat. No. 4,866,750, although providing a rotatable film holder, does not present a means of keeping the spatial relationship between the film holder and x-ray source constant. Specifically, the film holder rotates with respect to the x-ray source i.e. the angle between the cross-sectional plane of the x-ray beam and the film holder changes with rotation of the film holder. It is imperative in dental radiography, when employing the "parallel technique", that the cross-sectional plane of the x-ray beam and the plane of the surface of the film to be irradiated are parallel. This parallelism minimizes distortion of the resultant radiographic image.

U.S. Pat. No. 4,538,292 describes a biteblock which rotates or deflects about an axle. It is this rotation, or deflection, which causes the biteblock to be more securely grasped between the upper and lower teeth. The film holder and alignment rod cannot be rotated to an angle selected by the operator.

The herein disclosed invention offers distinct advantages with respect to the prior art. By securing a rotatable axle to, or within, the biteblock, and attaching the film holder to one end of an extension bar, and attaching the other end of the extension bar to the rotatable axle, and further attaching a beam alignment rod to the other end of the axle, the film holder and alignment rod can rotate, while the biteblock remains stationary. Further, the biteblock and alignment rod can rotate together, and, consequently, the predetermined spatial relationship of the film to the x-ray beam remains constant for all angles of the above mentioned rotation. And this rotation is possible while the biteblock is maximally secured between the upper and lower jaws in a position parallel to the occlusal plane. For example, when using the paralleling technique for dental radiography, the angular relationship of the cross-sectional plane of the x-ray beam with the surface of the film should be 0 degrees, i.e. parallel. This parallelism will be maintained for all angles of rotation of the axle in the aforementioned device while the patient is biting on a biteblock securely held parallel to the occlusal plane.

Patented device, U.S. Pat. No. 4,633,493, offers a rotatable biteblock while maintaining a constant spatial relationship between film holder and x-ray source. However, it uses two wing-like biteblocks secured to the two ends of a transverse axle. The film holder and x-ray alignment rod are attached to the center of the axle, in contrast to being attached to opposite ends of an axle as described previously. This center attachment design precludes its use with x-ray positioners which have the biteblock laterally offset to the film holder when viewed from the x-ray source. The lateral offset makes it possible for these instruments to be used during endodontic treatment. Endodontic files and rubber dam clamp are unaffected by the biteblock. The herein disclosed invention has an advantage by offering a means for the film holder, when laterally off-set to the biteblock when viewed from the x-ray source, to rotate together with the alignment rod.

By offering a means of rotation for the above described laterally off-set film holder devices e.g. U.S. Pat. No. 4,598,416, another problem is alleviated by the herein disclosed invention. With the laterally off-set film holder instruments, it is often necessary, when taking a posterior radiograph, for example, to place the biteblock between the anterior teeth. In this position the biteblock cannot be placed at an angle in the lateromedial direction of the curvature of the palate because the anterior teeth cannot serve as a fulcrum. However, by securing a rotatable axle to or within the biteblock, and attaching the film holder and the beam alignment rod in the manner previously described for the herein disclosed invention, the film holder can be rotated to the desired angle, while the biteblock remains stationary between the upper and lower anterior teeth. Consequently, the spatial relationship e.g. parallel, between the film and the cross-sectional plane of the x-ray beam (via the beam alignment rod with positioning ring) remains constant with all angles of rotation of the axle.

Although the drawings herein depict the device having a configuration consistent with taking radiographs of posterior teeth, it should not be assumed that this invention is limited to being used in the posterior area. This device works equally well for taking radiographs in the anterior region of the mouth and of the anterior teeth.

Accordingly, it is first an object of this invention provide an x-ray film positioner for intra-oral radiography that can be held in a maximally secured fashion between the upper and lower teeth, while the film holder, and the therein contained film, can be optimally angulated with respect to the structures to be radiographed.

Further, it is an object of this invention to provide a means by which the predetermined angle, or spatial relationship e.g parallel, between the film and x-ray source will be maintained for all angles of rotation of the film holder with respect to the oral structures and teeth.

It is an additional object of this invention to provide a means by which x-ray film positioners for intra-oral radiography, which have their film holders laterally off-set to their biteblocks when viewed from the x-ray source, can be securely held by the anterior teeth when taking a radiograph of the posterior teeth, regardless of the angulation of the film holder and beam alignment rod.

IN THE DRAWINGS

Figure 1:
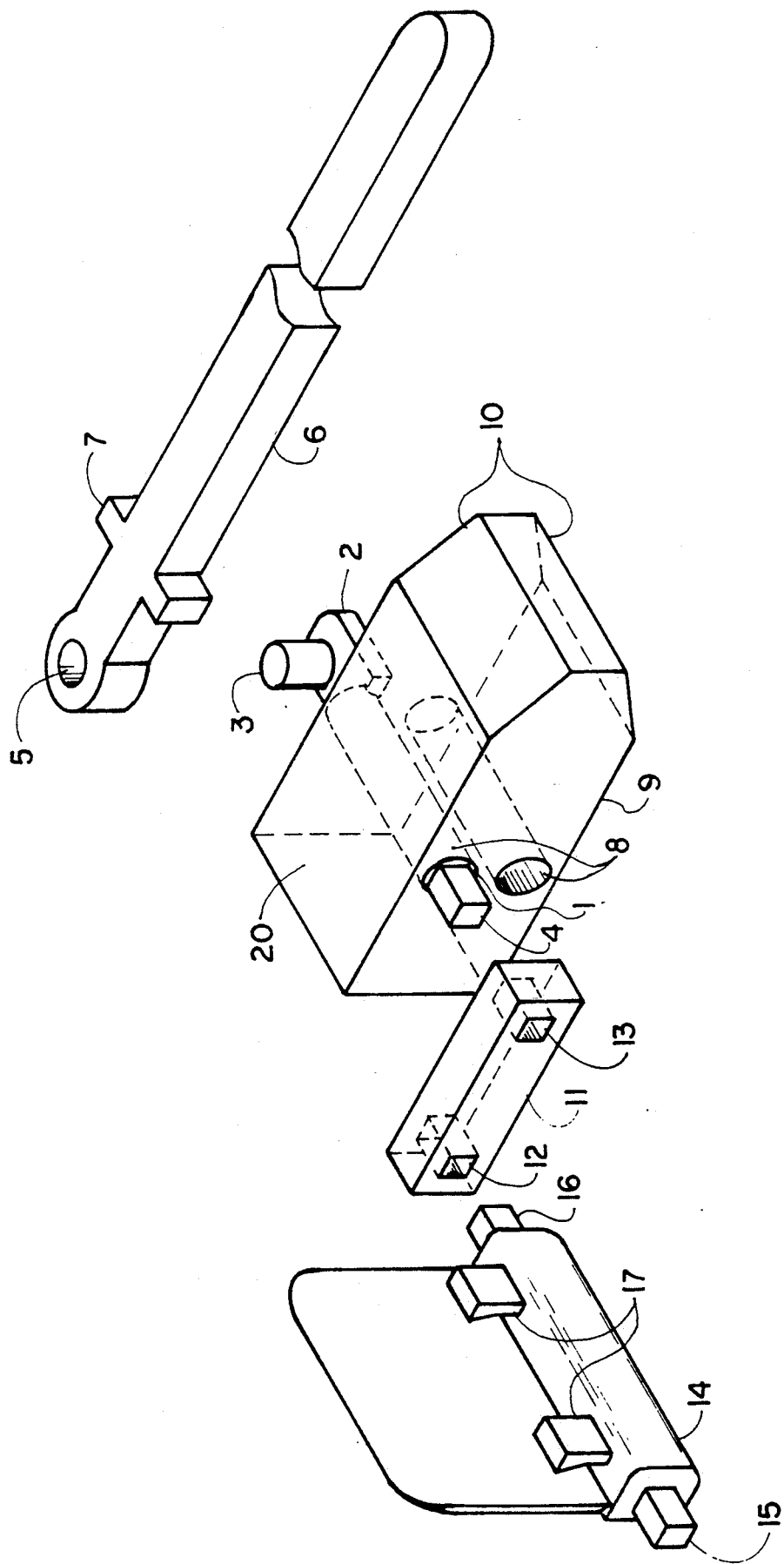
FIG. 1 is an exploded perspective view of the invention.

The invention in FIG. 1 substantially consists of a biteblock 9. The two flat surfaces of the biteblock, which are of equal size and lie parallel to the long axes of the holes 8, are the biting surfaces 20. Also comprising biteblock 9 are bevels 10 at one edge superiorly and inferiorly when viewed from the x-ray source. The beveling mitigates laceration and irritation of the patient's oral mucosa of the cheeks. The invention functions equally well without said bevels, and they exist simply for patient comfort and protection.

Biteblock 9 also consists of two cyclindrical holes 8 bored completely through the body of the biteblock. The longitudinal axes of the holes will lie in an anteroposterior direction when the device is used to radiograph the patient's posterior teeth. Accordingly, the location of the holes 8 in the latero-medial direction for the illustrated embodiment are approximately at the middle of the biting surfaces of the biteblock 9. The location of the holes in this direction can vary with different embodiments of the invention. Another possible embodiment could incorporate multiple sets of holes.

Contained within one of the holes 8 is a rotatable, cyclindrical axle 1. One of the protruding ends of the axle is a square peg 4. The other protruding end of the axle is a flat, rectangular stage 2 from which extends a cyclindrical peg 3. When the axle 1 is placed into hole 8, the rectangular stage 2 acts as a stop to help seat the axle to the exact depth. Further, the extension bar 11, when attached to peg 4, in conjunction with stage 2, hold the axle 1 in place during rotation of said axle.

Attached to peg 3, by means of hole 5, is an alignment rod 6. Any suitable x-ray source alignment device, such as a simple ring or square, can be attached perpendicularly to the long axis of the alignment rod 6. Protruding from two sides of the alignment rod 6, at right angles to its long axis, are two stops 7. When the stop contacts the body of the biteblock, regardless of the degree of rotation of the axle 1, the operator is certain the alignment rod 6 is perpendicular to the film. Two stops are necessary so that the alignment rod 6 can be attached with the exact same orientation to peg 3, and the biteblock 9, regardless of the quadrant of the patient's mouth in which the device is used.

Attached to axle peg 4, by means of rectangular hole 13, is extension bar 11. Attached to the other end of extension bar 11 is film holder 14. Said attachment is accomplished by peg 16 (or 15) on the film holder, and rectangular hole 12 in extension bar 11. There is one peg 15 and 16 on each side of the film holder 14 to accommodate the use of the device in all four quadrants of the patient's mouth. Tabs 17 hold the film packet in place.

Although the illustrated embodiment of the invention would be used in the patient's upper right and lower left quadrants, by re-configuring the device, it can be used in the upper left and lower right quadrants as well. Each of these assemblies is a mirror image of the other. Further, the illustrated embodiment depicts the device assembled for use in the posterior area of the patient's mouth. But the device can be used in all areas of the mouth including the anterior area in the upper and lower jaws. However, the assembly of the device for the upper anterior area requires a slight modification in that the axle 1 is put into inferior hole 8. Extension bar 11 and the film holder 14 are attached as described previously. This alternate configuration for the upper anterior teeth is necessary because the film packet must be placed into the film holder with its longest dimension parallel to the long axes of the upper anterior teeth. Placing the film in this manner necessitates additional clearance between the film holder and the palate. Hence, axle 1 is placed through the inferior hole i.e. the hole most inferior to the subject tooth. With the film holder 14, via extension bar 11, attached to axle 1 contained in the inferior hole, the additional clearance is provided.

Figure 2:
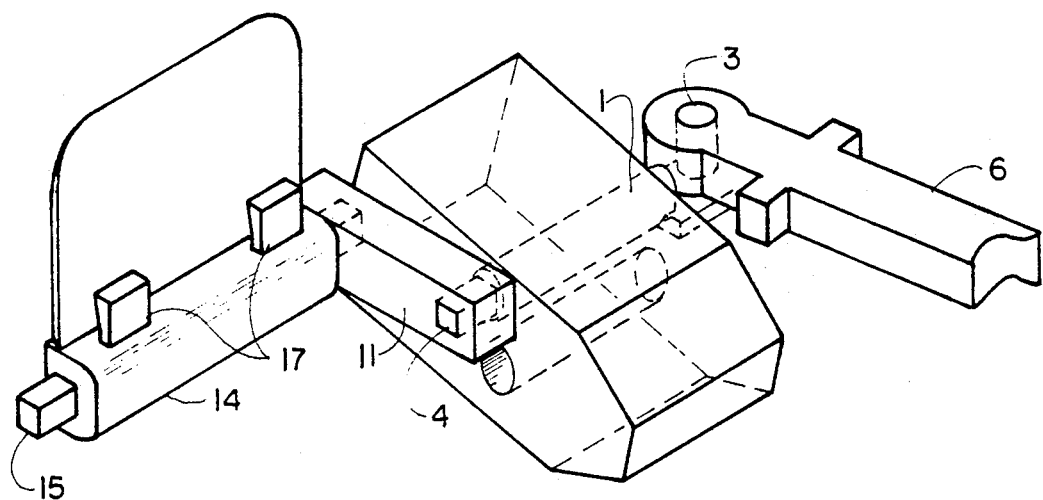
FIG. 2 is a perspective view of the invention showing the film holder-axle-alignment rod complex rotated to an angle other than 0 degrees with respect to the biteblock.

FIG. 2 is an illustration of the device in which the film holder 14 and alignment rod 6 are rotated, by means of the axle 1, to an angle other than zero degrees with respect to the biting surfaces of the biteblock. The configuration of the device as illustrated, with the angulation of the film holder and alignment rod as depicted, is most appropriate for the upper right posterior area of the patient's oral cavity.

Figure 3:
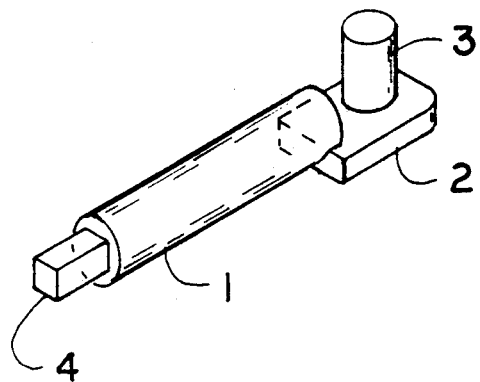
FIG. 3 shows a perspective view of the rotatable axle

FIG. 3 depicts rotatable axle 1. Illustrated is rectangular peg 4 for attachment to the extension bar 11, shown in FIG. 1 and FIG. 2. Also shown is rectangular stage 2, which acts as a stop; and cyclindrical peg 3 needed for attachment to alignment rod 6, illustrated in FIG. 1 and FIG. 2.

Figure 4:
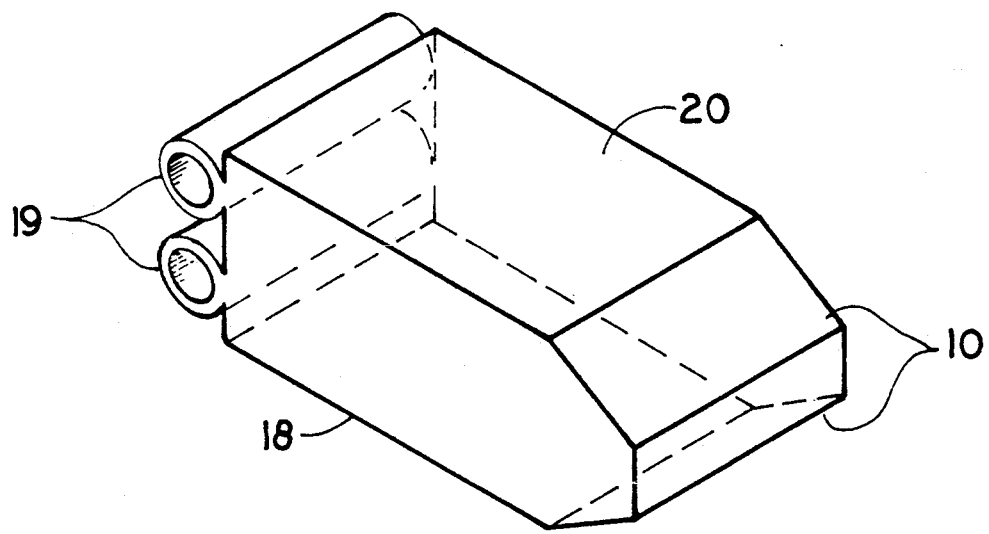
FIG. 4 shows a perspective view of an alternative embodiment of the biteblock.

FIG. 4 depicts a biteblock 18 which is an alternative embodiment of biteblock 9. In this illustration, two tubes 19 are attached to the end of the biteblock opposite the beveled end, and are substitutes for the holes 8, as shown in FIG. 1 and FIG. 2. The tubes serve the same function as holes 8 as described above.

I claim:

1. An intra-oral radiographic, rotatable positioning instrument for x-ray film, comprising:
   a) An axle, contained within the body of a biteblock, in such a manner, that said axle will remain freely rotatable about the biteblock, further comprising:
      attached to one end of said rotatable axle is an extension bar;
      attached to the other end of said extension bar is an x-ray film holder, and
      attached to the other end of said rotatable axle an x-ray source alignment rod.

2. An instrument as claimed in claim 1 wherein said biteblock consisting of two (2) holes bored completely through the body of said biteblock, such that the longitudinal axes of the holes are parallel to each other, and each hole is equally suitable to engage said rotatable axle.

3. An instrument as claimed in claim 1 wherein said biteblock consisting of two (2) tubes attached to at least one surface of said biteblock, and such that the longitudinal axes of the tubes are parallel to each other, and further, each tube is equally suitable to engage said rotatable axle.

4. An instrument as claimed in claim 1, wherein the edges of said biteblock are beveled.

* * * * *